July 7, 1925.  
R. W. J. FLETCHER  
1,545,243  
TRANSMISSION GEARING FOR MACHINE TOOLS AND OTHER PURPOSES  
Filed Jan. 11, 1923
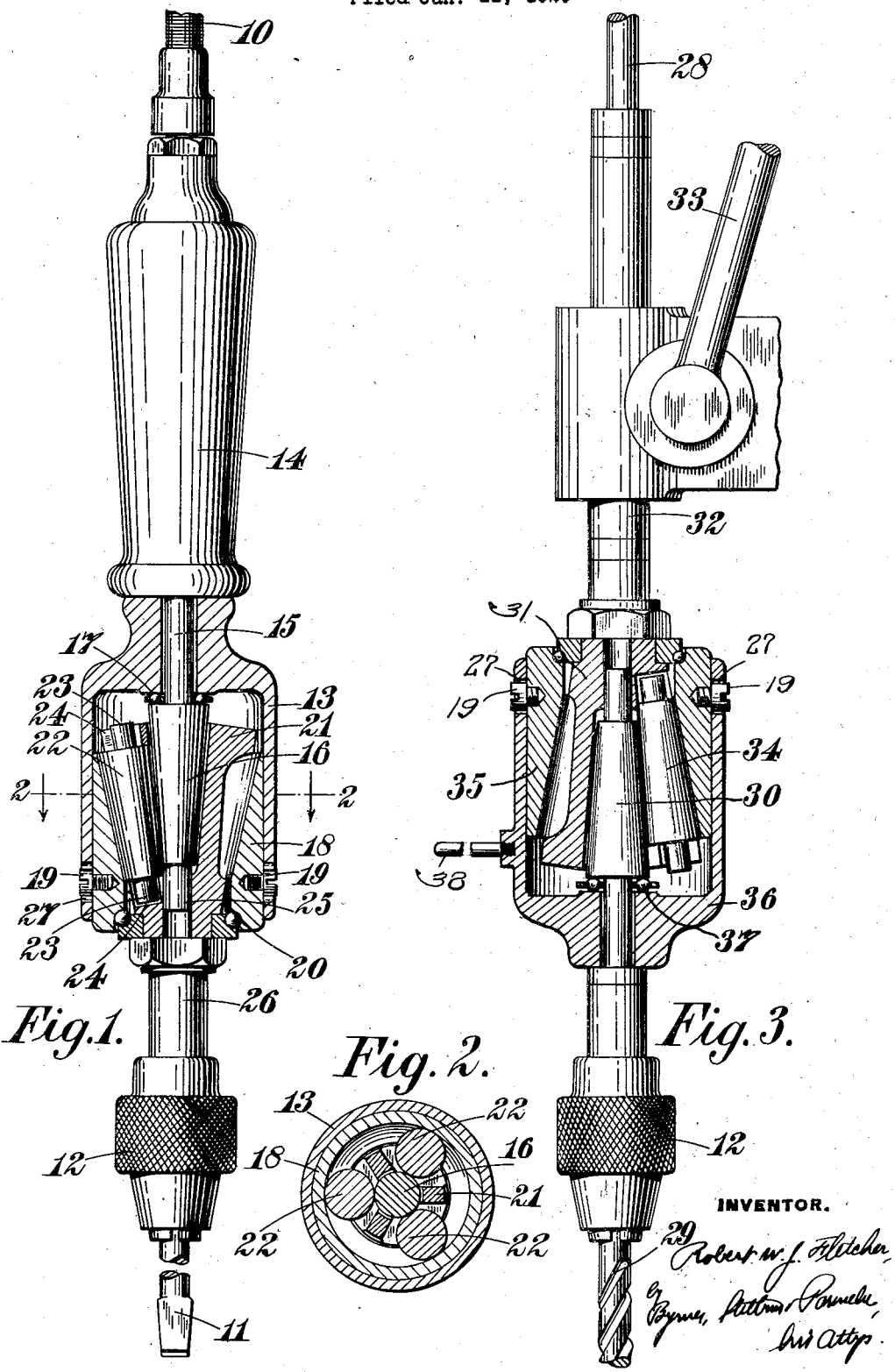
INVENTOR.

Patented July 7, 1925.

1,545,243

UNITED STATES PATENT OFFICE.

ROBERT WILLIAM JOHNSTON FLETCHER, OF EDINBURGH, SCOTLAND.

TRANSMISSION GEARING FOR MACHINE TOOLS AND OTHER PURPOSES.

Application filed January 11, 1923. Serial No. 611,955.

*To all whom it may concern:*

Be it known that I, ROBERT WILLIAM JOHNSTON FLETCHER, a subject of the King of England, residing at Edinburgh, Midlothian, Scotland, have invented certain new and useful Improvements in Transmission Gearing for Machine Tools and Other Purposes, of which the following is a specification.

This invention is for improvements in or relating to transmission gearing for machine tools and other purposes and has for one of its objects to provide a construction which shall be particularly applicable to power driven screw drivers and drills. It is to be understood, however, that various features of the invention are also applicable to other types of machine tools and machinery.

It is useful to drive a power driven screw driver by a flexible shaft in order to permit the screw driver to be shifted about around an article which is having the screws driven into it. A difficulty which has been experienced, however, is that the speed at which the screw driver should be rotated is very much less than the most efficient speed at which to drive the flexible shaft. Another requisite in these tools is that when the screw has been driven sufficiently far home the rotation of the screw driver may readily be discontinued so as not to damage the screw. It will be appreciated that these difficulties and requisities also apply more or less to other types of machine tools such as drills, grinders, tapping tools and the like, with the difference that in certain of the tools, notably drills for metal and grinders, the speed of the tool can be maintained much higher than can the speed of a screw driver. Hence in some cases an increase rather than a reduction in speed may be required.

According to the primary feature of the present invention there is provided in or for a machine tool or other shaft-driver member, a transmission gearing operating between a main shaft and a tool or like carrier driven by the latter, said transmission gearing, comprising epicyclic rollers so mounted in relation to each other that they are only pressed into operative driving engagement with each other when the tool is pressed against its work and that at other times (*i. e.*, when said pressure is relaxed) they are free to slip. Conveniently, the gearing comprises a conical sun roller, conical planet rollers loosely carried in a cage to rotate about the sun roller, and a co-operating conical surface enclosing the planet rollers, said planet rollers being only pressed into operative driving engagement with the sun roller and the said co-operating surface when the tool is pressed against its work. The sun roller and planet cage may be connected one to each of the main shaft and the tool or like carrier driven thereby, and the aforesaid co-operating conical surface may be connected to a handle whereby the gearing and carrier are manipulated.

For a more complete understanding of the invention there will now be described, by way of example only and with reference to the accompanying drawings, certain constructional forms of the transmission gearing according to the invention. It is to be understood, however, that the invention is not limited to the precise constructional details set forth.

In these drawings:—

Figure 1 is an elevation, partly in section, of a construction of gearing which is particularly applicable to a screw driver driven by a flexible shaft.

Figure 2 is a section on the line 2—2 of Figure 1, and

Figure 3 is a view corresponding to Figure 1 of a modified construction in which a drill is shown as being driven from a rigid shaft at a greater speed than the latter.

Like reference numerals indicate like parts throughout the drawings.

Referring firstly to Figures 1 and 2, a flexible shaft is indicated at 10 and a screw driver at 11, the latter being received in a suitable carrier 12. Above the carrier is a casing 13 to which is secured a handle 14 by which the tool is held and manipulated. Projecting down through the handle and casing is the end 15 of the flexible shaft and this carries at its end a sun friction roller 16 of conical formation. Between the head of this roller and the adjacent face of the casing 13 is a thrust bearing 17. Inside the casing 13 is an internally coned member 18 which is mounted in place by suitable screws 19 and which is received on a bearing 20 rotating with the tool holder 12. Lying between the roller 16 and the conical member 18 is a cage 21 made in one piece in which three conical planet rollers 22 are mounted. These rollers have projecting ends 23 which are loosely received in radial recesses or slots 24 in the two ends of the cage 21, which recesses or slots are open at the periphery of the cage to permit the planet-rollers to be removed from the cage by bodily movement thereof in a direction at right angles to their axes. The roller 16 is preferably also provided with an extension 25 which is centred in the cage 21. The cage 21 is connected to the carrier 12 through a member 26. It will be observed that the screws 19 are received in elongated holes 27 in the casing 13 so that a certain amount of movement is permitted between the members 13 and 18.

In operation it will be seen that the flexible shaft 10 will rotate the sun roller 16 which will drive the planet rollers 22 about their own axes. Since these rollers will be bearing upon the surface 18, however, they will be caused to travel along the latter and thus will drive the cage 21 and the screw driver 11 which is carried thereby. The casing 13 will be held stationary by the handle 14. The operator will bear upon the handle 14 to force the point of the screw driver into the head of the screw and as long as he is exerting this pressure the sun roller 16 will be forced into driving engagement with the planet rollers and the latter into similar engagement with the member 18. Whenever, however, the operator relaxes his pressure the rollers will be free to slip. Therefore, when this is done rotation of the screw driver 11 will cease even though the shaft 10 still continues to rotate. This slipping will be facilitated by the loose mounting of the rollers 22 and by the freedom of the member 18 to move relatively to the casing 13; moreover these arrangements just described also permit of an effective clutching action to be secured when necessary, since they permit the rollers to shift radially and seat themselves correctly in position despite any wear which may have occurred. It will be appreciated that the speed at which the screw driver will be driven will be less than that of the driving shaft 10 by reason of the epicyclic rollers.

By reference to Figure 3 it will be seen that the invention can also be applied to machine tools or the like in which the drive is taken from a rigid shaft 28 and is transmitted to a tool 29 through gearing which multiplies the speed instead of reducing it as shown in the construction in Figures 1 and 2. In the construction shown in Figure 3, the tool carrier 12 is connected to a sun roller 30 while a planet cage 31 is connected to a member 32 which is driven by the shaft 28 but can be slid longitudinally thereof by the adjusting handle 33 operating say through a rack and pinion, not illustrated. The planet rollers 34 are loosely mounted in radial slots in the cage 31 and are reversed in direction as compared with the sun roller 30. The co-operating conical surface 35 is carried in a stationary casing 36 by screws 19 entering into elongated slots 27 as shown in the construction in Figures 1 and 2. A thrust bearing 37 is provided in the casing 36 and in the head of the roller 30. The casing 36 is held stationary by any suitable means, such as a projection 38 adapted to bear against some stationary part of the machine; or the casing could be held stationary by hand.

In the construction shown in Figure 3, the planet cage 31 is driven by the shaft 28 and, its rollers being caused to rotate about their axes by reason of the engagement with the member 35, drives the sun roller 30 and consequently also the tool 29 at a speed higher than that of the shaft 28. The automatic declutching of the rollers already described in connection with Figures 1 and 2 is also obtained in the construction shown in Figure 3. In both of the constructions illustrated, the end of the driving shaft 10 or 18 attached to the tool is in alignment with the longitudinal axis of the tool, which is found to be a very convenient arrangement, as the driving shaft is well out of the way of the operator.

It is to be understood that the invention is not limited to the precise constructional details hereinbefore set forth. For example, a number of planet rollers other than three may be employed, and the ratio of the speed of the driving to the driven member may be varied both up and down according to circumstances by suitably designing the rollers.

I claim:—

1. In self-adjusting friction-gearing, the combination of a conical sun-roller, conical planet rollers surrounding the same and fixedly carrying each a pivot-pin at each end, a conical abutment surrounding and making contact with said planet-rollers at their peripheries, and a one-piece cage having radially directed slots into which said pivot-pins extend, which slots permit movement of the planet-rollers bodily towards and away from said sun-roller in a radial direction, but always maintain constant the angle at which the planet-rollers are spaced apart around the sun-roller whatever radial positions they may take up, said sun-roller and cage being relatively movable axially of the sun-roller and the latter being journaled in said cage, substantially as described.

2. In self-adjusting friction-gearing, the combination of a conical sun-roller, conical planet-rollers surrounding the same and fixedly carrying each a pivot-pin at each end, a member surrounding and having a conical friction surface in contact with said planet-rollers, and a one-piece cage having radial slots opening at its periphery into which said pivot-pins extend, which slots permit movement of the planet-rollers bodily towards and away from said sun-roller and permit removal of said planet-rollers from said cage by a bodily movement thereof in a direction at right angles to their axes, said sun-roller and cage being relatively movable axially of the sun-roller, substantially as described.

3. In a portable machine-tool, a casing, a shaft journaled therein, a conical sun-roller carried by said shaft within said casing, a member fitted in said casing and having a conical friction surface, said member being held against rotation relative to said casing but being movable axially therein, conical planet-rollers surrounding said sun-roller and engaging said conical friction surface and fixedly carrying each a pivot-pin at each end, and a one-piece cage journaled in said member and having radial slots into which said pivot-pins extend, which slots permit movement of the planet-rollers bodily towards and away from said sun-roller, said sun-roller and cage being relatively movable axially of the sun-roller, substantially as described.

4. Friction gearing having a driving shaft, a driven shaft and a casing, a conical sun-roller fixedly connected to one of said shafts, a cage fixedly connected to the other shaft, a conical bearing surface in the casing adapted to move longitudinally thereof but held against rotation relative to the casing, and conical rollers in the cage adapted to move longitudinally therewith and in rolling contact with the sun roller and the bearing surface, the arrangement being such that when pressure is applied to one of the shafts to move it longitudinally relative to the other the rollers will be moved into driving relation with the sun roller and the bearing surface to drive the driven shaft, substantially as described.

In testimony whereof I have signed my name to this specification in the presence of two subscribing witnesses.

ROBERT WILLIAM JOHNSTON FLETCHER.

Witnesses:
   Thos J. Muleady,
   Jessie P. Batchelor.